(12) United States Patent
Low et al.

(10) Patent No.: US 8,918,665 B2
(45) Date of Patent: Dec. 23, 2014

(54) OPERATING INPUT DEVICE IN LOW POWER MODE WITH AUXILIARY SENSOR CALIBRATED TO MAIN SENSOR

(76) Inventors: Wing Kong Low, Sunnyvale, CA (US); Debanjan Mukherjee, San Jose, CA (US)

(*) Notice: Subject to any disclaimer, the term of this patent is extended or adjusted under 35 U.S.C. 154(b) by 514 days.

(21) Appl. No.: 13/244,020

(22) Filed: Sep. 23, 2011

(65) Prior Publication Data
US 2013/0080811 A1  Mar. 28, 2013

(51) Int. Cl.
*G06F 1/32* (2006.01)

(52) U.S. Cl.
CPC ............ *G06F 1/3259* (2013.01); *G06F 1/3234* (2013.01); *Y02B 60/1253* (2013.01)
USPC .......................................... 713/323; 713/322

(58) Field of Classification Search
CPC ......... G06F 1/3203; G06F 1/266; G06F 1/32; G06F 1/325; G06F 1/3259; G06F 1/3287
See application file for complete search history.

(56) References Cited

U.S. PATENT DOCUMENTS

| | | | |
|---|---|---|---|
| 6,611,921 B2 | 8/2003 | Casebolt et al. | |
| 7,062,547 B2 | 6/2006 | Brown et al. | |
| 7,161,578 B1 | 1/2007 | Schneider | |
| 7,280,935 B2 * | 10/2007 | Edwards | 702/150 |
| 7,425,945 B2 | 9/2008 | Arrigo et al. | |
| 7,479,944 B2 | 1/2009 | Casebolt et al. | |
| 7,696,980 B1 | 4/2010 | Piot et al. | |
| 7,787,405 B2 | 8/2010 | Dettinger et al. | |
| 2006/0047783 A1 | 3/2006 | Tu | |
| 2007/0109269 A1 * | 5/2007 | Feldmeier | 345/166 |
| 2007/0111796 A1 | 5/2007 | Giaimo et al. | |
| 2008/0168267 A1 | 7/2008 | Bolen | |
| 2010/0039381 A1 | 2/2010 | Cretella, Jr. et al. | |
| 2010/0182270 A1 * | 7/2010 | Caliskan et al. | 345/174 |
| 2011/0111799 A1 | 5/2011 | Kothari et al. | |
| 2011/0187931 A1 | 8/2011 | Kim | |
| 2011/0207509 A1 | 8/2011 | Crawford | |
| 2011/0296217 A1 * | 12/2011 | Nishimura et al. | 713/323 |

* cited by examiner

*Primary Examiner* — Kenneth Kim
(74) *Attorney, Agent, or Firm* — Womble Carlyle Sandridge & Rice, LLP

(57) ABSTRACT

An input device for an electronic device. The input device includes a power source, a processor in communication with the power source. Additionally, the input device includes a main sensor in communication with processor and configured to detect a user input and an auxiliary sensor in communication with the processor and configured to detect a user input. When the input device is in a normal power mode or active state, the main sensor is activated and when the input device is in a low power state the main sensor is deactivate and the auxiliary sensor is activated.

20 Claims, 7 Drawing Sheets

OPERATING INPUT DEVICE IN LOW POWER MODE WITH AUXILIARY SENSOR CALIBRATED TO MAIN SENSOR

TECHNICAL FIELD

The present invention relates generally to electronic devices and more specifically, to input devices for electronic devices.

BACKGROUND

Electronic devices such as computers, gaming consoles, or smart phones, may use input devices, such as a mice, joysticks, remote controls, and so on. The input devices may be used to track a user's input and transfer that movement to the electronic devices. Often input devices may include a sensor in order to sense a user's input motion, e.g., hand movement. The sensor, however, may have to scan or sample at a high rate in order to detect the user's movement quickly and detect small movement changes. A high sampling rate may prevent the input device from going into a low power or sleep mode, thus, these input devices may use a substantial amount of power.

SUMMARY

Examples of embodiments described herein may take the form of an input device for an electronic device. The input device includes a power source and a processor coupled to the power source. Additionally, the input device includes a main sensor coupled to the processor and configured to detect a user input and an auxiliary sensor in communication with the processor and configured to detect a user input. When the input device is in a normal power mode or an active state, the main sensor is activated and when the input device is in a low power state the main sensor is deactivated and the auxiliary sensor is activated.

Other embodiments may take the form of a method for reducing power consumption for an input device. The method may include entering the input device into a sleep mode by a processor. The method may further include, detecting, by an auxiliary sensor, a first user input to the input device and in response to the user input, waking a main sensor by the processor. Further, the method may include detecting, by the auxiliary sensor and the main sensor a second user input and sleeping the main sensor after the second user input has been detected.

Still other embodiments may include a mouse for communicating a user input to a computing device. The mouse includes a processor configured to place the mouse in a first power state and a second power state. Additionally, the mouse includes a low power sensor having a first sampling rate and configured to sense at least one parameter and an accurate sensor having a second sampling rate and configured to sense at least one other parameter. When the mouse is in the first power state the second sampling rate is slower than the first sampling rate; and when the mouse is in the second power state the first sampling rate and the second sampling rate are substantially equal.

SPECIFICATION

Figure 1A:
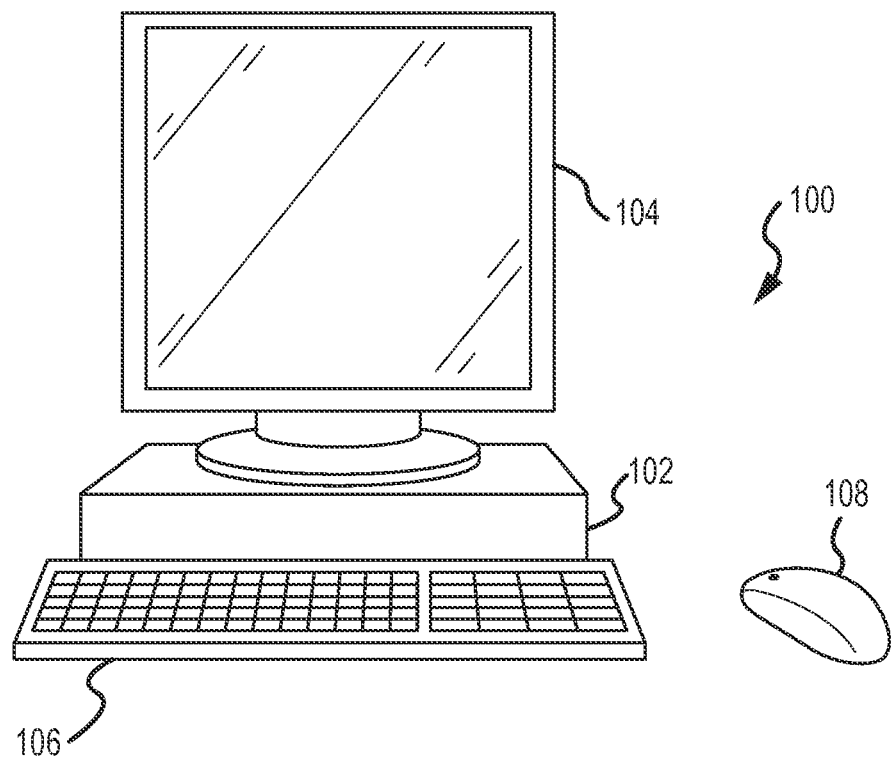
FIG. 1A is a front elevation view of a computer in communication with an input device and a keyboard.

Some embodiments described herein may take the form of various input devices for electronic devices. Example input devices, such as computer mice, joysticks, keyboards, wireless inputs or the like, may consume less power when compared to a comparable input device. In certain embodiments, the input device may include an auxiliary sensor and a main sensor. The two sensors may work in combination with one another in order to reduce the power consumption of the input device while maintaining input sensitivity of the input device. The main sensor may be a sensor with high accuracy or sensitivity, such as an optical sensor. The auxiliary sensor may be a sensor with a lower accuracy or sensitivity than the main sensor, but may use less power than the main sensor.

The input device may operate in an active mode and a sleep mode at different times. During the active mode the main sensor (or both sensors) may be active and thus may sense the user's input movements. For example, the input device may be a computer mouse and the main sensor may be an optical sensor that tracks the mouse's movement across a surface. In its active mode, the input device may accurately determine the user's input movements through the optical sensor, but may consume relatively high power.

During the sleep mode, the main sensor may be placed into low power mode (e.g., a "sleep mode") or may be turned off. As the main sensor may be deactivated, the input device may draw less power. For example, the main sensor may have a high sampling rate, e.g., every few milliseconds, in order to accurately and quickly track user input. The input device may have to provide power to the main sensor and/or processor for each sample taken, which may use a significant amount of power. Reducing or eliminating the sample rate of the main sensor may conserve power.

During sleep mode, the auxiliary sensor may be activated, thereby placing it in a normal operating state or "wake mode." The auxiliary sensor may require significantly less power than the main sensor, but may not be as accurate with respect to tracking a user's input. During sleep mode the auxiliary sensor is active and may have a sufficiently high sample rate so that it may sense an input substantially as it is entered. In these embodiments, the auxiliary sensor may sense a different input than the main sensor, which may require less power, or may be a different type of sensor than the main sensor, e.g., an accelerometer versus an optical sensor. In other examples, the auxiliary sensor may be substantially the same type of sensor as the main sensor, but may not be as fast and/or precise as the main sensor, and thus may save power due to the fact that it may not sample as frequently as the main sensor.

Once the auxiliary sensor has sensed an input, the input device may wake or return to a high power state. In this state, the main sensor may be activated and thus the input device may more accurately track user inputs. The main sensor may sample at a higher frequency or may sense more detailed user input (e.g., actual movement of the device over a surface) than the auxiliary sensor. As the main sensor may only be activated while the user is actually providing input, the input device may have a significant reduction in power but may not decrease in sensitivity during use of the device. In the wake state, the auxiliary sensor may remain awake to provide additional user input information separate from the main sensor, or may enter a sleep mode or low power state.

Furthermore, the input device may be able to wake up quickly from sleep mode. "Quickly," in this context, means that the input device may transition between sleep and wake modes in approximately 30-50 milliseconds. Often, in conventional input devices, the transition from sleep mode to active mode may be limited by the sampling rate of the main sensor. For example, in conventional input devices, the transition between sleep and wake depended on the main sensor. When the main sensor is in a sleep mode, in order to save power the sample rate significantly decreases. During sleep mode, if a user picks up or otherwise provides an input to the conventional input device, the main sensor only detects this input on its next sample or sensing cycle. Due to the fact that the sampling rate is significantly decreased during sleep mode, the main sensor may not detect the user's input for awhile, for example, 200-500 milliseconds. Once the main sensor detects the input of the user, the input device generally wakes up.

As the auxiliary sensor may have a high sampling rate, it may be able to more quickly sense a user input (even during sleep mode) than the sleep sampling rate of conventional main sensors, and then wake the input device. Therefore, the latency of the response of the input device during low power or sleep mode may be reduced. Thus, a user may never notice that the input device entered a sleep mode, as the response time to user input may be substantially the same in either sleep or normal mode.

In another example, the sampling rate or sensitivity of the main sensor may be reduced while the input device may maintain a high sampling rate. In this example, the main sensor may be complemented by the auxiliary sensor during wake mode of the input device. In other words, the auxiliary sensor may sample at a higher rate in order to fill in the gaps between samples taken by the main sensor. This example may allow the input device to have a high level of sensitivity, but, by reducing the sampling rate and times of the main sensor, the power used by the input device may be reduced, even while the input device is in a normal operating mode. Further, the combination of the main sensor and auxiliary sensor may help to prevent drift or other sensor errors. This is possible as the two sensors may be used to calibrate each other, as the two inputs from each sensor may be compared, and in one example, the main sensor (which may be more precise than the auxiliary sensor) may correct the auxiliary sensor if it drifts or otherwise becomes inaccurate.

Figure 1B:
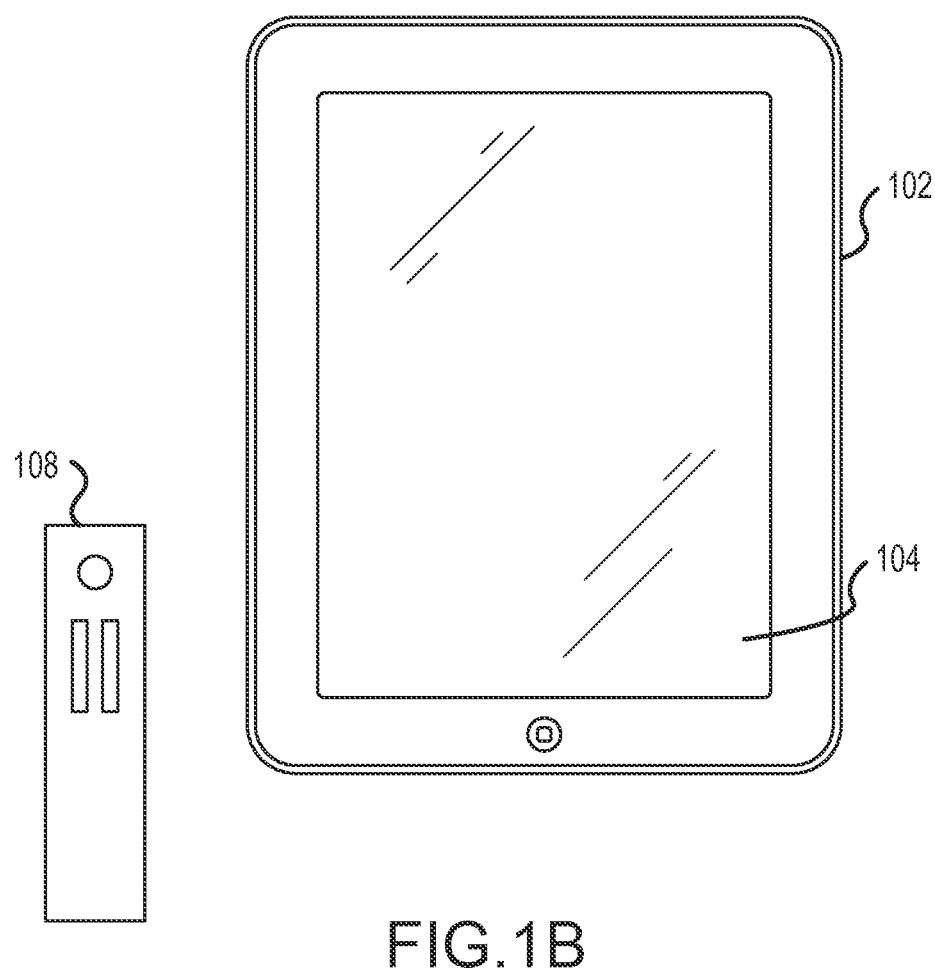
FIG. 1B is a perspective view of a mobile electronic device in communication with another embodiment of the input device of FIG. 1A.

The input device may be used with a variety of different electronic devices. FIG. 1A is a diagram of an exemplary system 100 including a computer 102, a display 104, a keyboard 106, and an input device 108. The computer 102 may be substantially any type of computing device, such as but not limited to, a laptop, desktop, smartphone, mobile phone, tablet, gaming console, digital video disc player, digital video recorder, and so on. FIG. 1B is another example of the system 100, with the computer 102 being a mobile telephone.

The computer 102 may receive user input from the input device 108 and the keyboard 106. The computer 102 may be in electrical communication with the input device 108, the keyboard 106 and the display 104.

The display 104 may be substantially any type of display screen, such as a plasma, liquid crystal, or other display mechanism. The display 104 may be combined with the computer 102 (see, e.g., FIG. 1B), or may be separate from the computer 102.

The keyboard 106 may be used to provide input to the computer 102 by proving for keys that may be depressed by the user. The keys may correspond to various symbols, such as the alphabet and numbers. In some examples, the input device 108, which is discussed in more detail below, may include keyboard type keys and may function as a keyboard for the computer 102.

The input device 108 may sense user input and communicate the user input to the computer 102. The input device 108 may be a mouse, joystick, remote control, or other type of input mechanism. In some examples, the input device 108 may be incorporated into the computer 102. For example, the computer 102 may be a mobile phone and may include a capacitive touch screen as well as may include sensors for detecting user movement of the entire computer 102. In this example, the input device 108 may be used to sense the user input as the entire computer 102 is moved in particular manner.

Figure 2A:
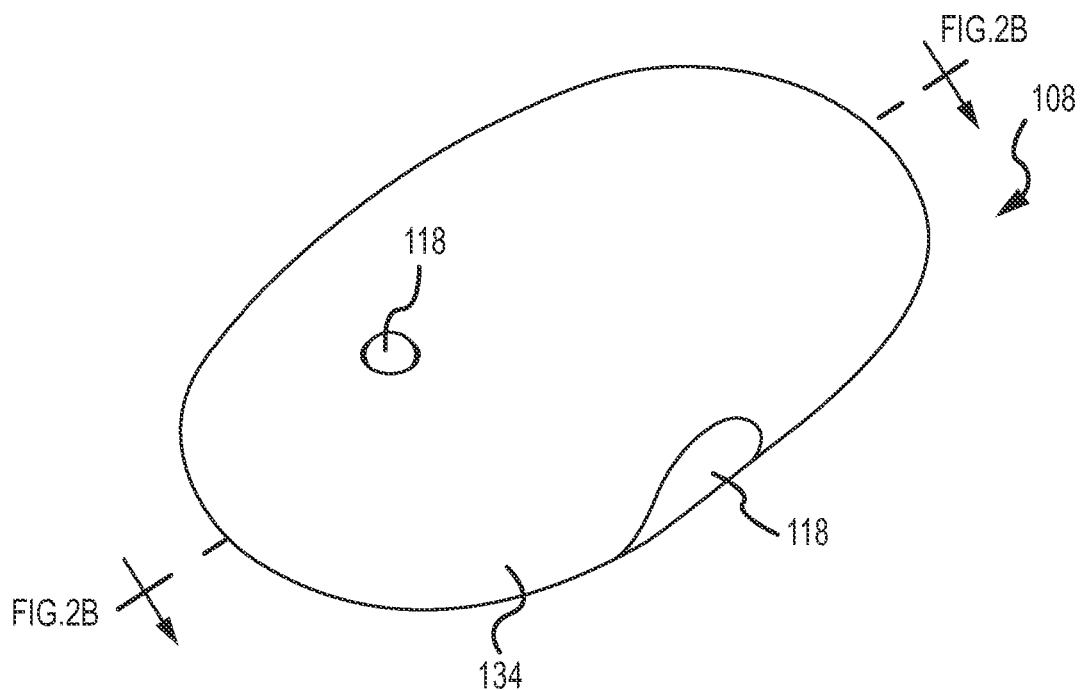
FIG. 2A is a perspective view of the input device of FIG. 1A.
Figure 2B:
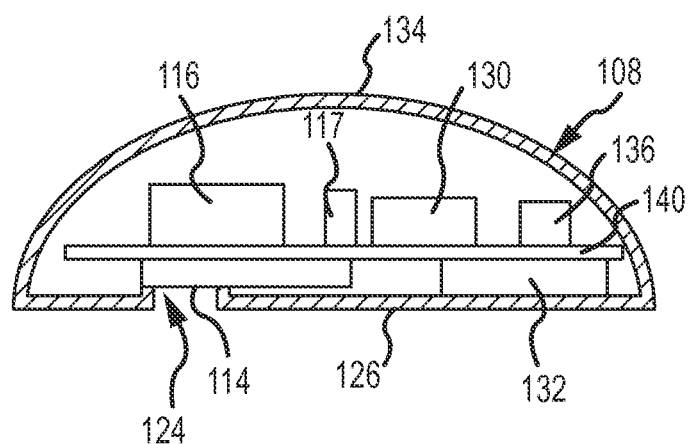
FIG. 2B is cross-section view of the input device taken along line 2A-2A in FIG. 2.

FIG. 2A is an isometric view of an exemplary embodiment of the input device 108. FIG. 2B is a cross-sectional view of select components of the input device 108, with other components hidden for clarity. The input device 108 may include a main sensor 114 and an auxiliary sensor 116. The two sensors 114, 116 may be used to track various user inputs.

The input device 108 may be moved, manipulated, pressed, or otherwise altered or interacted with in order to sense a user input. In one embodiment, the input device 108, as shown in FIG. 2A, may be shaped as a mouse and the user may move the input device 108 across a surface. As the input device 108 is moved, the sensors 114, 116 may track the movement. The input sensed by the sensors 114, 116 may be communicated to the computer 102, e.g., via a wireless connection or a wired connection. The computer 102 may then provide a corresponding response based on the input by the user.

It should be noted that the input device 108 may have shapes other than those illustrated in the figures. For example, as shown in FIG. 1B, the input device 108 may be a remote control configured to be held in a user's hand. In this embodiment, the user may move and change the orientation of the input device 108 in order to provide an input.

Additionally, the input device 108 may include one more external buttons 118. The external buttons 118 may act as additional user inputs. The external buttons 118 may be a switch, button, track ball, wheel, and so on. Similarly, the external buttons 118 may include symbols, such as alphanumeric characters, in order to identify the input provided to the computer 102 when the button is pressed.

Figure 3:
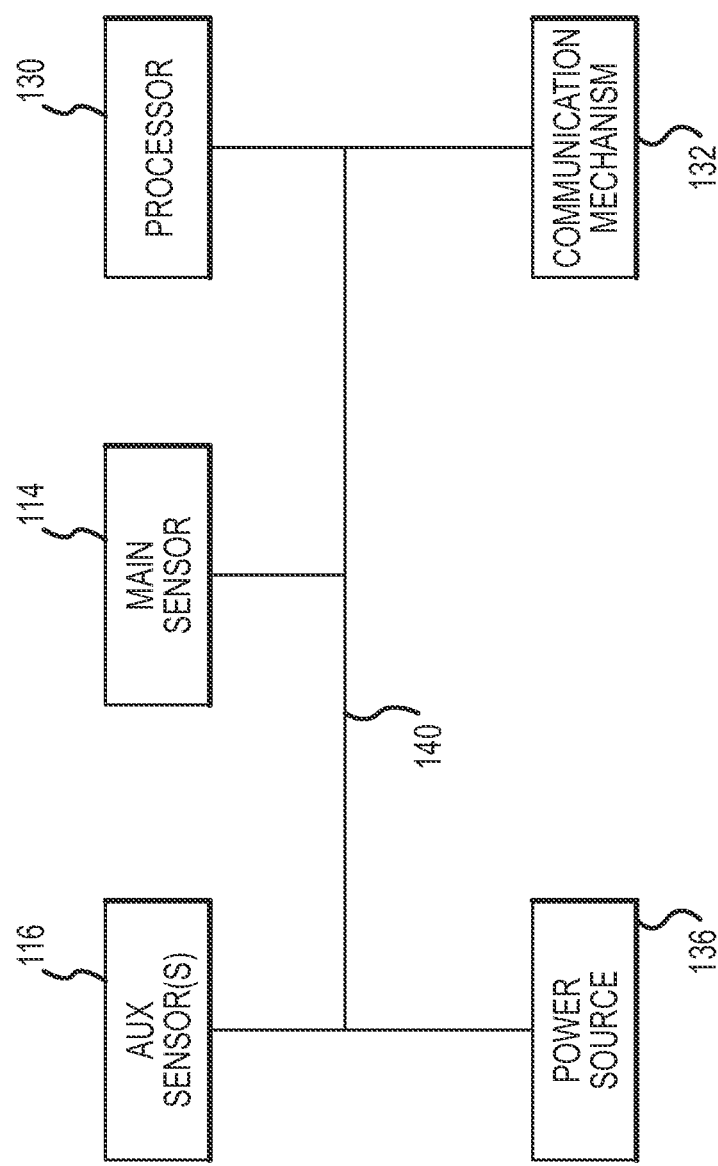
FIG. 3 is a block diagram illustrating select components of the input device of FIG. 1A.

FIG. 3 is an exemplary block diagram of the input device 108. Referring to FIGS. 2B and 3, the input device 108 may include an enclosure 134 or case at least partially surrounding internal components; sample internal components include a processor, power source, the auxiliary and/or main sensor, and a communication mechanism. The external buttons 118, as shown in FIG. 2A, may be exposed or accessible through the enclosure 134. The enclosure 134 may include at least one aperture 124 on a bottom surface for allowing a main sensor 114 or an auxiliary sensor 116 to be optically connected to an outer surface of the input device 108.

The input device 108 may further include the auxiliary sensor 116, the main sensor 114, a processor 130, a communication mechanism 132, and a power source 136 that may be interconnected electronically via a communication cable 140, printed circuit board, or the like.

The main sensor 114 may be substantially any type of sensor that may sense a user's input. For example, the main sensor 114 may be an optical sensor configured to determine motion of the input device 108 across a surface. In this example, the main sensor 114 may include a light source, such as a light emitting diode or laser diode, that illuminates the travel surface. As the input device 108 moves over the surface, the main sensor 114 may detect a phase shift in light emitted from the light source and reflected off the travel surface. This phase shift may be used by the input device 108 to extrapolate the device's motion. In these examples, the main sensor 114 or a portion thereof may be positioned adjacent or on top of the aperture 124 to receive the reflected light. In this manner the light source may be in optical communication with the support surface so that the main sensor 114 may track the movements of the input device 108

In another example, the main sensor 114 may include a trackball and a movement sensor, where the trackball may rotate or move and the movement sensor may track the changes of the trackball, such as the speed of rotation, direction of rotation and angle of the trackball. In still other examples, the main sensor 114 may be a three axis accelerometer, a gyroscope, a capacitive sensor, a pressure sensor, a temperature sensor, an infrared optical sensor, and so on.

The main sensor 114 may have a particular sampling rate that may monitor user input, such as motion, heat, touch, and so on. The sampling rate may be increased during high power states and decreased during low power states. The "sampling rate" is defined as the number of samples per time unit taken from a signal of the main sensor 114. The sampling rate may be determine how often the main sensor 114 may measure the changes in the light source, trackball movements, or other input changes. The frequency at which the signal is measured may affect the power usage of the main sensor 114. For example, if the sampling rate is high the sensitivity of the input device 108 may be greatly increased, but, because the main sensor 114 may be frequently inputting data, large amounts of power may be expended. Alternatively, the lower the sampling rate, the less sensitive the input device 108 may be, but the less power the main sensor 114 may consume. For an optical sensor in active mode, a typical sampling rate may be approximately 2 ms to 10 ms (100 to 500 Hz). In sleep mode, a typical sampling rate drops may drop to about 100 ms to-1 s. On the contrary, the main sensor 114 during active mode may have a sampling rate ranging approximately between 5-10 ms (100-200 Hz).

The auxiliary sensor 116 or low power sensor may be substantially any type of sensor that may track an input of a user. In some embodiments, the auxiliary sensor 116 may be a different type of sensor than the main sensor 114; however, in other embodiments, the auxiliary sensor 116 may be the same type of sensor as the main sensor 114. For example, the main sensor 114 and the auxiliary sensor 116 may both be accelerometers. In this example, the main sensor 114 may be a three-axis accelerometer and the auxiliary sensor 116 may be a one or two-axis accelerometer. The main sensor 114 may more accurately sense a user input to the input device 108, but may require more power than the auxiliary sensor 116 in that it may require a fast sample rate. In another example, the main sensor 114 may be an optical sensor, and the auxiliary sensor 114 may be an accelerometer. Additionally, in some embodiments, the auxiliary sensor 116 may require less power than the main sensor 114 when in active mode.

The auxiliary sensor 116 may be an accelerometer (either one, two, or three axis), gyroscope, capacitive touch sensor, heat sensor, vibration sensor, or the like. In some embodiments, the auxiliary sensor 116 may have substantially the same sampling rate as the main sensor 114, but may be a less accurate sensor and therefore may require less power. In other embodiments, the auxiliary sensor 116 may have a lower sensitivity (e.g., sampling rate) than the main sensor 114 or may otherwise use less power than the main sensor 114. In one example, the auxiliary sensor 116 may have a sampling rate of approximately 50-100 ms, this may allow the input device to have a relatively quick transition from sleep to wake modes.

The processor 130 may process signals from the main sensor 114 and the auxiliary sensor 116. The processor 130 may also control each sensor 114, 116 and may place each sensor 114, 116 in a low power or sleep mode and a wake or normal mode. For example, the processor 130 may vary the sampling rate of the sensors 114, 116. In the low power state the sampling rate for a particular sensor 114, 116 may be low, while in the high power state that sampling rate may be significantly higher. The processor 130 may convert input signals from the sensor 114, 116 into two-dimensional coordinates or magnitudes of angular changes. These coordinates and magnitudes may be used to determine the amount of a user input, and the relative input of the user.

It should be noted that in some examples, the processor 130 may not be included in the input device 108, but may be included in the computer 102. In these examples, the signals transferred between the sensors 114, 116 and the processor 130 may be communicated across a communication mechanism (e.g., wiring, radio signals, etc.).

The input device 108 may also include a communication mechanism 132. The communication mechanism 132 transfers signals to and from the input device 108 to the computer 102. The communication mechanism 132 may be a wired or wireless device. For example, the communication mechanism 132 may be a Universal Serial Bus connection, Bluetooth connection, radio signal, or the like. The communication mechanism 132 may allow the input device 108 to be wirelessly connected to the computer 102, so that the input device 108 may be able to move around a support surface without getting wrapped in a cord.

The power source 136 may provide power, if required, to the sensors 114, 116, the processor 130, and/or the communication mechanism 132. The power source 136 may be a battery or other portable power source or may be a wired power source, e.g., power cord. If the input device 108 is a corded device (that is, wired), the power source 136 may be power from the computer 102. Whereas, if the input device 108 is wireless the power source 136 may be a battery or other portable source.

The input device 108, via the processor 130, may selectively alter the sensitivity and/or activation of the sensors 114, 116. In one example, the sample rate of the main sensor 114 may be selectively modified to be increased or decreased depending on whether the input device 108 is being used by a user.

Figure 4:
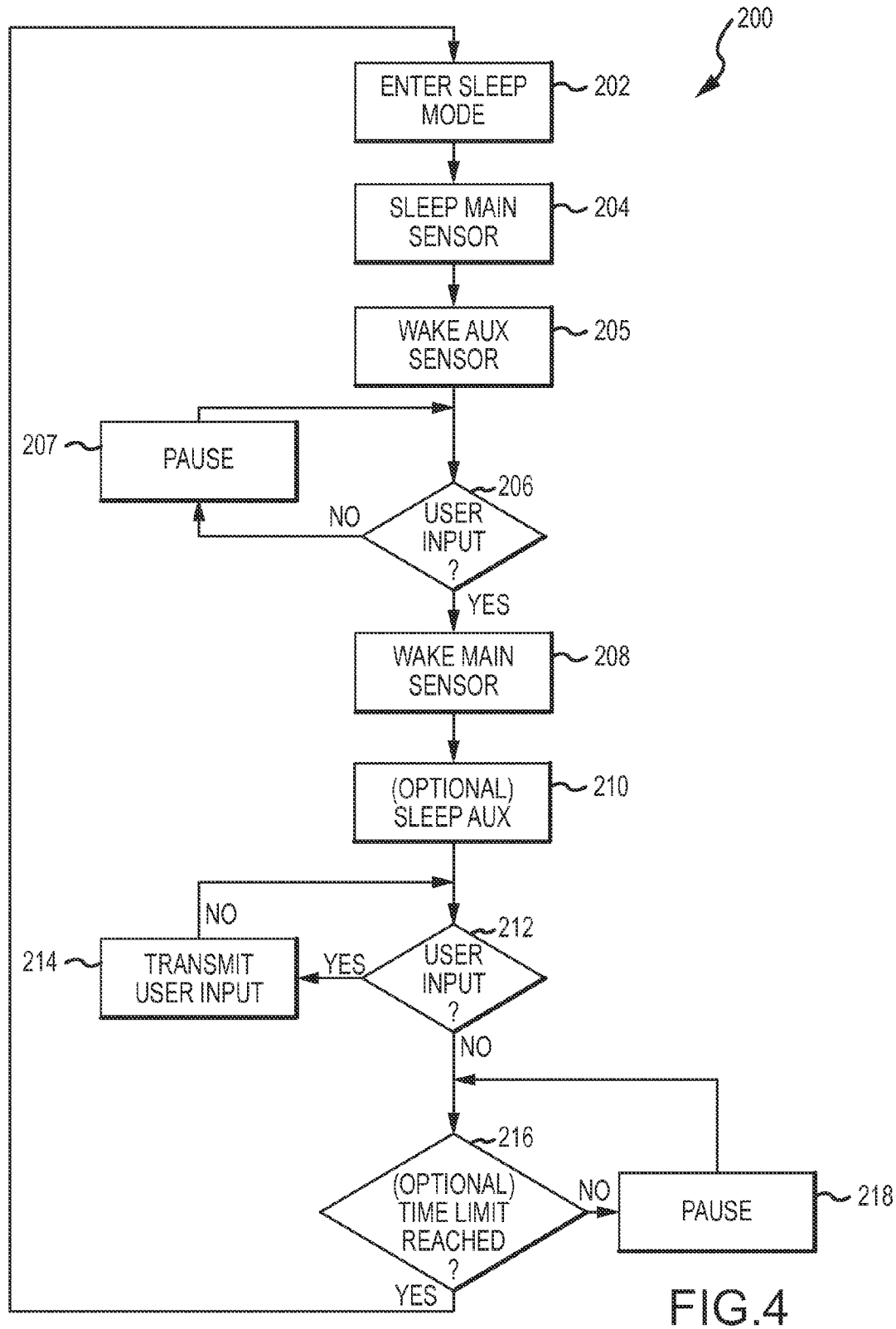
FIG. 4 is a flow chart illustrating an exemplary method for reducing the power consumption of the input device.

FIG. 4 is a flow chart illustrating an exemplary method 200 for reducing the power consumption of the input device 108. The method 200 may begin with operation 202, in which the input device 108 may enter a sleep or low-power mode. The input device 108 may enter sleep mode or low power mode after a period of non-usage or after a predetermined time elapses. In sleep mode, the input device 108 may use a reduced amount of power from the power source 136, which may increase battery life in certain embodiments.

Once the input device 108 enters sleep mode in operation 202, the method 200 may proceed to operation 204 and the main sensor 114 may be transitioned to a low power state. In one example, the sampling rate of the main sensor 114 may be reduced, so that the main sensor 114 may only check for user inputs at extended intervals. In another example, the main sensor 114 may be completely turned off or deactivated, thereby dropping its sample rate to zero. In many examples, the power required by the main sensor 114 may be significantly reduced from its normal operating state (that is, its wake mode). For example, if the sampling rate of the main sensor 114 is reduced, the main sensor 114 may not have to activate the light emitting diode (or other light source) as often in order to determine if there has been movement of the input device 108. Further, in the low power state, as the sampling rate of the main sensor 114 may be substantially reduced from its normal operating state, as the processor 130 may not be processing inputs from the samples and the main sensor 114 may not need to sense for input during sleep mode. This may significantly reduce the power consumption of the main sensor 114.

Once the main sensor 114 is transitioned to its sleep mode or low power state, the method 200 may proceed to operation 205. Operation 205 wakes the auxiliary sensor 116. In some embodiments, the auxiliary sensor 116 may be in a constant power state and may not need to be woken. However, in the embodiment illustrated in FIG. 4, once the main sensor 114 transitions to a low power state, the auxiliary sensor 116 may transition into a normal operation mode. While transitioning to a normal operating mode, the sampling rate of the auxiliary sensor 116 may be increased from a sleep mode sampling rate and/or power may be provided to the auxiliary sensor 116 from the power source 136. As the auxiliary sensor 116 is activated, the input device 108, with the main sensor 114 transitions to sleep mode.

After the auxiliary sensor 116 is woken, the method 200 may proceed to operation 206. Operation 206 determines if a user has provided an input to the input device 108. For example, the auxiliary sensor 116 may sample at a continuous rate in order to determine if the input device 108 has moved, whether a user has touched the enclosure 134, or whether the use has provided another type of input. The sampling rate of the auxiliary sensor 116 may be significantly reduced as compared to the normal sampling rate of the main sensor 114. In other examples, the sampling rate of the auxiliary sensor 116 may be approximately the same as the main sensor 114, but due to the sensor type the auxiliary sensor 116 may still require less power than the main sensor 114. In these examples, the auxiliary sensor 116 may not provide as accurate data as the main sensor 114, but may offer significant power savings over the main sensor 114.

If in operation 206, the auxiliary sensor 116 does not detect any user input, the method may proceed to operation 207. In operation 207 the auxiliary sensor 116 may pause before proceeding again to operation 206 to determine if there is a user input. The duration of this pause may correspond to the frequency of the sampling rate of the auxiliary sensor 116. For example, the pause may be the time between each sampling operation performed by the auxiliary sensor 116.

In operation 206, if the auxiliary sensor 116 senses a user input, the method 200 may proceed to operation 208 in which the main sensor 114 is transitioned to a normal operating state. In other words, the main sensor 114 is woken up from sleep mode. The main sensor 114 may have an increased sampling rate as compared to its sampling rate while in sleep mode or otherwise may be activated.

In conventional input devices, the transition between sleep mode and normal mode may be limited by the sample rate of the optical sensor. This is because in most conventional input devices the sampling rate of the main sensor is decreased in order to reduce power consumption. The reduced sampling rate means that the input device may only detect an input once every cycle, and as the cycle is reduced during sleep mode the input device may not detect a user input for an extended period. Thus, the device may not sense a user input in order to transition into a wake mode until a full cycle has been completed.

The delay or latency in transitioning between sleep and wake in conventional input devices may be significant. This is because in order for a conventional optical sensor to have a reduced power consumption, the sampling rate may need to be decreased significantly. However, this decrease may cause a user to have to move the input device multiple times in order to actually have his or her input sensed by the low frequency sample rate of the optical sensor during sleep mode. On the contrary, during sleep mode of the input device 108, the auxiliary sensor 116 may have a continuous sample rate that may be the same as or increased from the sampling rate of the input device 108 during normal operation. Thus, although the auxiliary sensor 116 may not be as sensitivity to particular movements of the input device 108, the latency in transitioning from sleep mode to normal mode may be significantly improved. This is because the auxiliary sensor 116 may be frequently sampling for user input.

After or during operation 206, the method 200 may proceed to optional operation 210. Optional operation 210 may transition the auxiliary sensor 116 to a sleep or low power mode. For example, the sampling rate of the auxiliary sensor 116 may be reduced or eliminated and/or power provided to the auxiliary sensor 116 may be reduced. Optional operation 210 may reduce the power used by the input device 108, as the power used by the auxiliary sensor 116 may be reduced while the main sensor 114 is activated. In some embodiments, the main sensor 114 may have a much higher sensitivity than the auxiliary sensor 116 and thus the auxiliary sensor 116 may not substantially increase the sensitivity of the input device 108 while the main sensor 114 is operating.

In other examples, the auxiliary sensor 116 may be used in combination with the main sensor 114 in order to increase the sensitivity of the input device 108 during wake mode. In these embodiments, the dual inputs may provide accurate and quick user input tracking.

After optional operation 210 or after operation 208, the method 200 may proceed to operation 212 and the main sensor 114, and optionally the auxiliary sensor 116, may determine if there is a user input. The sensors 114, 116 my determine if the input device 108 has been moved, touched, grasped, or otherwise manipulated. If there is a user input detected, the method 200 may proceed to operation 214 and the input device 108 may transfer the user input to the computer 102. The user input may then be represented as a moving cursor, data input, selection, and the like on the display 104. After operation 214 and the user input has been transmitted to the computer 102, the method 200 may return to operation 212.

If the main sensor 114 (and optionally the auxiliary sensor 116) does not detect any user input in operation 212, the method 200 may proceed to operational operation 216. Optional operation 216 determines whether a predetermined time limit has been reached. For example, the processor 130 may have a select amount of time of non-use (e.g., no user input detected). If the time limit has not been reached, then the method 200 may proceed to operation 218 and the input device 108 may pause. Then, the method 200 may return to operation 216 to determine if the time limit has been reached.

After operation 216 the method 200 may return to operation 202 and the input device 108 may enter sleep mode or low power state. The time limit may be aggressively set so that the input device 108 may rapidly switch between an active mode and sleep mode. For instance, if in operation 216 the set time limit is reached, the method 200 returns to operation 202 and the input device 108 enters sleep mode.

As the auxiliary sensor 116 is active during sleep mode, the input device 108 may be able to continuously monitor user input although it is in a sleep mode. For example, the sampling rate of the auxiliary sensor 116 may be increased as compared to a sleep mode sampling rate of the main sensor 114. This improves the latency of the input device 108, while not increasing the power usage of the input device 108, as the auxiliary sensor 116 may be a low-power type sensor, such as an accelerometer.

In other embodiments, where operation 216 may be omitted, the method 200 may proceed directly to operation 202 as soon as there is no user input detected. The input device 108 may transition to sleep mode without a set time frame due to the fact that in these embodiments the auxiliary sensor 116 may be always on. As the auxiliary sensor 116 may be continuously on, a user input that may occur may be captured or sensed regardless if the input device 108 is in sleep mode or active mode. Therefore, as soon as the input device 108 stops receiving a constant or substantially continuous input from the user, it may transition to sleep mode to save power without substantially risking missing a user input due to being in sleep mode.

Further, eliminating operation 216 may provide for a rapid transition between when the device is in active mode to when the device is in sleep mode. By transitioning faster between active and sleep modes, the input device 108 may use significantly less power than a comparable input device. This is because the power usage of the device 108 while in active mode may be increased as compared to when the input device 108 is in sleep mode. Therefore, by transitioning faster, power consumption by the input device 108 may be reduced.

In addition or alternatively to the method 200 illustrated in FIG. 4, the sensors 114, 116 may be used to calibrate each other sensor 114, 116 or may be used to increase the sensitivity of the input device 108. For example, in some instances, the auxiliary sensor 116, which may be a low power sensor, may be used as the primary sensor and the main sensor 114, which may be a high powered sensor, may be used to supplement the auxiliary sensor 116 by increasing the sensitivity of the auxiliary sensor 116.

Figure 5:
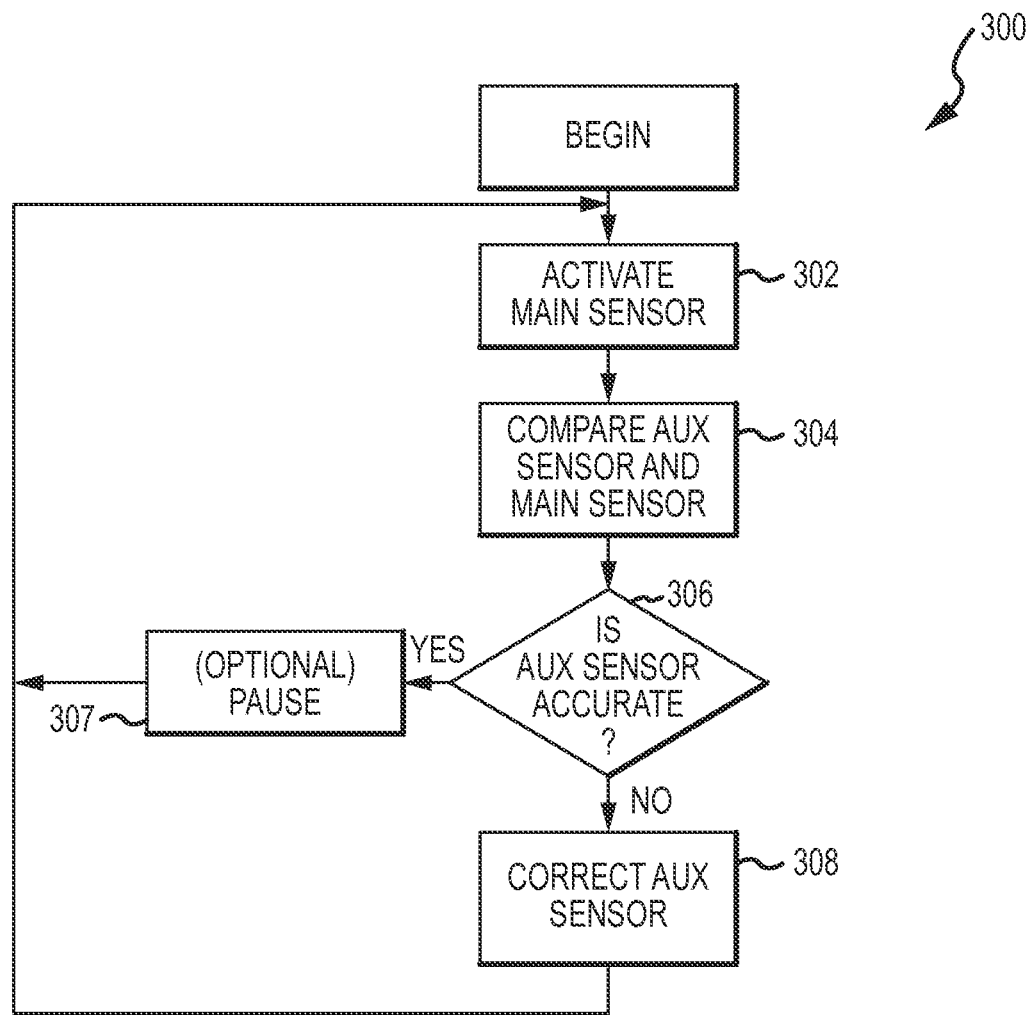
FIG. 5 is a flow chart illustrating an exemplary method for calibrating a sensor of the input device.

FIG. 5 is a flow chart illustrating an exemplary method 300 for increasing the accuracy and/or calibrating the sensors 114, 116 of the input device 108. The method 300 may begin with operation 302 and the input device 108 may be in normal mode and the main sensor 114 may be activated, e.g., as shown in operation 208 in FIG. 3.

Once the main sensor 114 is activated, the method may proceed to operation 304. In operation 304, the processor 130 may take and compare data points or samples for both the main sensor 114 and the auxiliary sensor 116. The sample comparison determines whether each sensor 114, 116 sensed a corresponding user input or parameter. Although the sensors 114, 116 may sense different inputs, e.g., movement of the input device 108 along a surface versus relative orientation of the input device 108, the sensed inputs may be correlated to each other. Accordingly, the comparison of sample points by the processor 130 may determine whether each data point corresponds to a similar user input.

After operation 304, the processor 130 may check the comparison between the main sensor 114 and the auxiliary sensor 116 to determine if the auxiliary sensory 116 is accurate. In some instances, the auxiliary sensor 116 may drift or detect noise which can induce an error in the user input sensed by the input device 108. Therefore, as the main sensor 114 may be as compared with the auxiliary sensor 116 and any inconsistencies between the actual input and the sensed input by the auxiliary sensor 116 may be detected.

If there is an inconsistency between the main sensor 114 and the auxiliary sensor 116, the method 300 may proceed to operation 308. Operation 308 may correct the auxiliary sensor 116. For example, the main sensor 114 may be used to calibrate the auxiliary sensor 116.

If in operation 306 the auxiliary sensor 116 is accurate or after operation 308, the method 300 may return to operation 302 or optionally operation 307. Operation 307 may pause the method 300 before returning to operation 302, this pause may be based on the sampling rate of the auxiliary sensor 116 and/or the main sensor 116. The time difference between operations 302 and operation 308 may be dependent upon the sampling rate different between the two sensors 114, 116. It should be noted that in operation 302, the main sensor 114 may be sampled at a rate that may be less than a rate of the auxiliary sensor 116. For example, the auxiliary sensor 116 may be sampling at a rate of approximately 5 milliseconds and the main sensor 114 may be sampling at a rate of 10 milliseconds.

In some embodiments, the input device 108 may include multiple auxiliary sensors 116. For instance, as shown in FIG. 2A, there may be a first auxiliary sensor 116 and a second auxiliary sensor 117. The second auxiliary sensor 117 may be substantially the same as the first auxiliary sensory 116. The three sensors 114, 116, 117 may then be used in conjunction with each other so that each particular sensor 114, 116, 117 may have a low sample rate, without decreasing the sensitivity of the input device 108. The input device 108, thus, may sample data points at a continuous rate, but a separate sensor may sample each consecutive data point.

Figure 6:
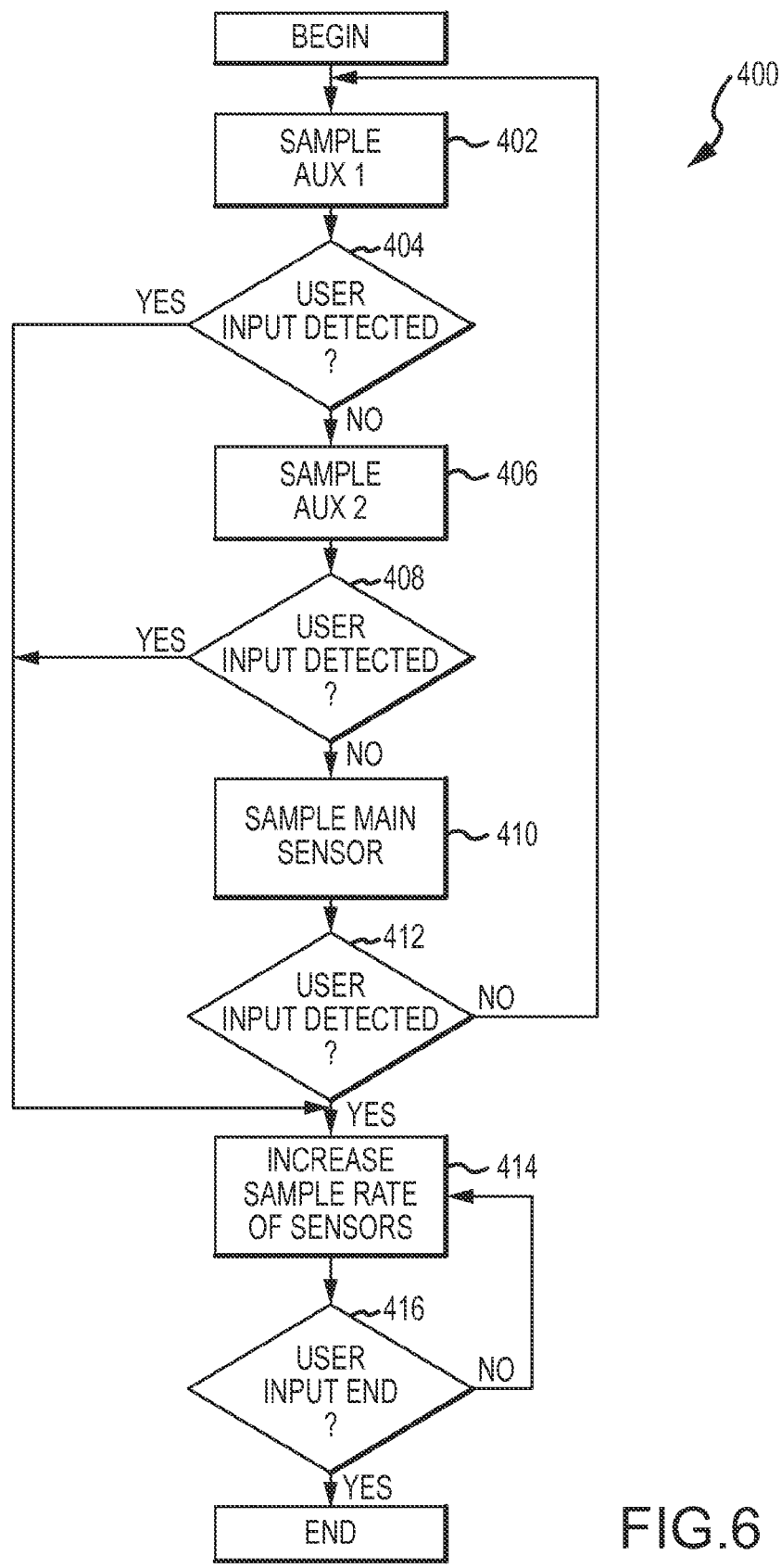
FIG. 6 is a flow chart illustrating an exemplary method for using the input device to sense input from a user.

FIG. 6 is a flow chart illustrating an exemplary method for using the sensors 114, 116, 117 to increase the user input sensitivity of the input device 108. The method 400 may begin with operation 402 and the first auxiliary sensor 116 may be sampled by the processor 130 to determine if there is a user input to the input device 108. After the auxiliary sensor 116 is sampled, the method 400 may proceed to operation 404 and the processor 130 may determine whether a user input has been detected. The type of user input detected may depend on the type of auxiliary sensor 116 used. For example, the user input may be detected as being a change in acceleration, a heat increase on the enclosure 134 of the device 108, a capacitive change, and so on. If a user input is detected, the method 400 may proceed to operation 414, which will be discussed in more detail below.

In operation 404, if the first auxiliary sensor 116 does not detect a user input, the method 400 may proceed to operation 406 and the second auxiliary sensor 117 may be sampled by the processor 130. The method 400 may then proceed to operation 408 and the processor 130 may determine whether a user input has been detected. As described above with respect to operation 404, the detected input may be varied depending on the type of auxiliary sensor 117 used. If a user input is detected, the method 400 may proceed to operation 414, discussed in more detail below.

If a user input is not detected in operation 408, the method 400 may proceed to operation 410 and the main sensor 114 may be sampled. The method 400 may then proceed to operation 412 and the processor 130 may determine whether a user input is detected. If a user input is not detected, the method 400 may return to operation 402. In this manner, the sampling rates of each of the sensors 114, 116, 117 may be set to a predetermined interval that may be three times the length of the sampling rate that may be required for a particular input device 108. For example, if an input device 108 has a particular sensitivity that samples at X seconds, the sampling rate of each sensor 114, 116, 117 may be set to a sample at a 3X seconds. Each sampling rate of the sensors 114, 116, 117 may be offset from each other, so that none of the sensors 114, 116, 117 may sample at the same time. Thus, the combination of sample rates will lead to a rate of X, as each sensor 114, 116, 117 samples at a rate of 3X, but every X a sample is taken. Therefore, the input device 108 may maintain the desired sensitivity of the input device 108. Furthermore, because the main sensor 114, which may be the most accurate sensor, but may also require the most amount of power, may have a longer sampling frequency (e.g., more time between samples), the power required to power the main sensor 114 may be reduced.

If movement is detected in any of operations 404, 408, or 412, the method 400 may proceed to operation 414. Operation 414 increases the sampling rate of the main sensor 114 and optionally the first and second auxiliary sensors 116, 117. In this manner, the input device 108 may be able to more accurately and quickly track user input as the user is using the input device 108. After operation 414, the method 400 may proceed to operation 416 and the processor 130 may determine whether the user input has ended or paused. In operation 416, the sensors 114, 116, 117 may be sampled in order to detect a user input, similar to operations 402, 406, 410. If the user inputs have not terminated, the method 400 may return to operation 414 to continue to sample the sensors 114, 116, 117 in order to detect the user inputs.

It should be noted that although the method 400 of FIG. 6 is discussed as utilizing the first auxiliary sensor 116 and the second auxiliary sensor 117, in some embodiments only one auxiliary sensor may be used. For example, the first auxiliary sensor 116 may have a sampling rate that may be two times the sampling rate of the main sensor 114. In this manner, the main sensor 114 may only be sampled ⅓ of the time, while the input device 108 may still maintain the required sensitivity. In these examples, the main sensor 114 may be sampled between each sample of the auxiliary sensor 116.

Conclusion

The foregoing description has broad application. For example, while examples disclosed herein may focus on an input device for a computer, it should be appreciated that the concepts disclosed herein may equally apply to input devices for other electronic devices. Similarly, although the input device may be discussed as being a mouse, the devices and techniques disclosed herein are equally applicable to other types of devices. Accordingly, the discussion of any embodiment is meant only to be exemplary and is not intended to suggest that the scope of the disclosure, including the claims, is limited to these examples.

What is claimed is:

1. A method for reducing power consumption of an input device having an auxiliary sensor and a main sensor, the method comprising:
calibrating the auxiliary sensor in accordance with a comparison between an input of the auxiliary sensor and an input of the main sensor;
entering, by a processor, the input device into a sleep mode in which the auxiliary sensor is in an active mode and the main sensor is in the sleep mode;
detecting, by the auxiliary sensor, a user input received by the input device from a user;
waking, by the processor, the main sensor; and
placing the main sensor in the sleep mode in response to the auxiliary sensor and the main sensor detecting no user input over a predetermined time period.

2. The method of claim 1, wherein detecting the user input further comprises sampling the auxiliary sensor to sense the user input.

3. The method of claim 2, wherein a sampling rate of the auxiliary sensor is faster than a sampling rate of the main sensor.

4. The method of claim 1, wherein the auxiliary sensor is an accelerometer and the main sensor is an optical sensor.

5. The method of claim 1, wherein the auxiliary sensor is one of a one axis or two axis accelerometer and the main sensor is a three-axis accelerometer.

6. The method of claim 1, wherein waking the main sensor includes transitioning the main sensor into the active mode.

7. The method of claim 2, wherein a sampling rate of the auxiliary sensor is approximately equal to a sampling rate of the main sensor.

8. A machine-readable non-transitory storage medium storing instructions that, when executed by a processor included in an input device, cause the input device to carry out steps that include:
calibrating a auxiliary sensor in accordance with a comparison between an input of the auxiliary sensor and an input of a main sensor;
entering, by the processor, the input device into a sleep mode in which the auxiliary sensor is in an active mode and the main sensor is in the sleep mode;
detecting, by the auxiliary sensor, a user input received by the input device from a user;
waking, by the processor, the main sensor; and
placing the main sensor in the sleep mode in response to the auxiliary sensor and the main sensor detecting no user input over a predetermined time period.

9. The machine-readable non-transitory storage medium of claim 8, wherein detecting the user input further comprises sampling the auxiliary sensor to sense the user input.

10. The machine-readable non-transitory storage medium of claim 9, wherein a sampling rate of the auxiliary sensor is faster than a sampling rate of the main sensor.

11. The machine-readable non-transitory storage medium of claim 8, wherein the auxiliary sensor is an accelerometer and the main sensor is an optical sensor.

12. The machine-readable non-transitory storage medium of claim 8, wherein the auxiliary sensor is one of a one axis or two axis accelerometer and the main sensor is a three-axis accelerometer.

13. The machine-readable non-transitory storage medium of claim 8, wherein waking the main sensor includes transitioning the main sensor into the active mode.

14. The machine-readable non-transitory storage medium of claim 9, wherein a sampling rate of the auxiliary sensor is approximately equal to a sampling rate of the main sensor.

15. An input device, comprising:
a processor; and
a memory storing instruction that when executed by the processor cause the input device to perform the steps of:
calibrating a auxiliary sensor in accordance with a comparison between an input of the auxiliary sensor and an input of a main sensor;
entering, by the processor, the input device into a sleep mode in which the auxiliary sensor is in an active mode and the main sensor is in the sleep mode;

detecting, by the auxiliary sensor, a user input received by the input device from a user;

waking, by the processor, the main sensor; and placing the main sensor in the sleep mode in response to the auxiliary sensor and the main sensor detecting no user input over a predetermined time period.

16. The input device of claim 15, wherein detecting the user input further comprises sampling the auxiliary sensor to sense the user input.

17. The input device of claim 16, wherein a sampling rate of the auxiliary sensor is faster than a sampling rate of the main sensor.

18. The input device of claim 15, wherein the auxiliary sensor is an accelerometer and the main sensor is an optical sensor.

19. The input device of claim 15, wherein the auxiliary sensor is one of a one axis or two axis accelerometer and the main sensor is a three-axis accelerometer.

20. The input device of claim 16, wherein a sampling rate of the auxiliary sensor is approximately equal to a sampling rate of the main sensor.

* * * * *

UNITED STATES PATENT AND TRADEMARK OFFICE
CERTIFICATE OF CORRECTION

PATENT NO. : 8,918,665 B2
APPLICATION NO. : 13/244020
DATED : December 23, 2014
INVENTOR(S) : Wing Kong Low et al.

Page 1 of 1

It is certified that error appears in the above-identified patent and that said Letters Patent is hereby corrected as shown below:

In the Claims

Column 12, line 27 (Claim 8, line 5): "a auxiliary" should read -- an auxiliary --.

Column 12, line 62 (Claim 15, line 5): "a auxiliary" should read -- an auxiliary --.

Signed and Sealed this
Twenty-third Day of June, 2015

Michelle K. Lee
*Director of the United States Patent and Trademark Office*